United States Patent [19]
Kono et al.

[11] Patent Number: 5,432,660
[45] Date of Patent: Jul. 11, 1995

[54] TWO-PART SLIDABLE COVER APPARATUS FOR TAPE CASSETTE WITH LOCK MECHANISM

[75] Inventors: Kazunori Kono; Tatsuto Mizukami; Hiroshi Nakamori; Koji Nakahara, all of Osaka, Japan

[73] Assignee: Matsushita Electric Industrial Co., Ltd., Osaka, Japan

[21] Appl. No.: 78,116

[22] Filed: Jun. 18, 1993

[30] Foreign Application Priority Data

Jun. 18, 1992 [JP] Japan ............... 4-159101

[51] Int. Cl.⁶ .................................. G11B 15/675
[52] U.S. Cl. ................... 360/96.6; 360/96.5
[58] Field of Search ............ 360/96.5, 96.6, 137; 369/77.1, 77.2, 78, 79; D14/163, 165

[56] References Cited

U.S. PATENT DOCUMENTS

| | | |
|---|---|---|
| 4,614,991 | 9/1986 | Murakami ............... 360/96.6 |
| 4,628,498 | 12/1986 | Takamatsu et al. ............... 369/194 |

FOREIGN PATENT DOCUMENTS

| | | | |
|---|---|---|---|
| 0232111 | 8/1987 | European Pat. Off. ........ 360/96.6 |
| 6-89560 | 3/1994 | Japan ................... 360/96.6 |
| 2211980 | 7/1989 | United Kingdom . |

*Primary Examiner*—Robert S. Tupper
*Assistant Examiner*—William R. Korzuch
*Attorney, Agent, or Firm*—Pollock, Vande Sande & Priddy

[57] ABSTRACT

A cover apparatus of a cassette tape recorder comprising first and second covers rotatable to be openable and closable with respect to a body of the tape recorder, the first cover having a holder to encase a tape cassette so that the tape cassette encased in the cassette holder is rotatable in accordance with the rotation of the first cover. The first and second covers are coupled to each other through a slider engaged with the second cover and slidable along a side surface of the first cover. The first cover rotates to cover the entire tape cassette in cooperation with the second cover when the second cover is closed with respect to the tape recorder body. The second cover vertically moves by a predetermined height with respect to a surface of the first cover in accordance with a first sliding operation of the slider when the first cover is opened by a first predetermined angle with respect to the tape recorder body and horizontally moving a predetermined distance with respect to the surface of the first cover in accordance with a second sliding operation of the slider when said the cover is opened by a second predetermined angle greater than the first predetermined angle so that a portion of the tape cassette protrudes from a tip portion of the second cover. This arrangement allows the easily insertion and removal into and from the holder of the first cover.

4 Claims, 12 Drawing Sheets

TWO-PART SLIDABLE COVER APPARATUS FOR TAPE CASSETTE WITH LOCK MECHANISM

BACKGROUND OF THE INVENTION

The present invention relates to a tape cassette cover apparatus rotatable together with a tape cassette holder to be openable and closable with respect to a tape recorder body.

A type of cassette tape recorder has a cover apparatus which acts as a portion of a tape cassette holder for encasing a tape cassette as exemplified by the Japanese Patent Publication No. 63-31244. This cassette tape recorder is arranged such that as illustrated in FIG. 17 a cover 61 is rotatable about a shaft 63a of a supporting section 63 provided in the tape recorder body 62 and a cassette holder 65 for encasing a tape cassette 64 (see FIGS. 18 and 19) is disposed along the cover 61. Further, a head block 66 is fixed to a root portion side of the cassette holder 65 to be integrally rotatable together with the cassette holder 65. Numeral 67 is a capstan vertically provided in the tape recorder body 62. In this cassette tape recorder, for encasing the tape cassette 64, as illustrated in FIG. 18 or 19 the cover 61 is greatly opened to be separated from the capstan 67 and then closed after the tape cassette 64 is inserted into the cassette holder 65 to advance toward the head block 66 provided at the cover 61 side. On the other hand, for taking out the tape cassette from the tape recorder, the cover 61 is similarly greatly opened as illustrated in FIG. 19 and the tape cassette 64 is picked up to be drawn from the cassette holder 65. Further, in such a type of tape recorder, for size-reduction of the tape recorder, a tip portion of the cover 61 is arranged to also act as a portion of one surface of the tape recorder, and for increasing the strength of the cover 61, the tip portion 61a of the cover 61 is curved toward the tape recorder body 62 side. The tape cassette 64 is, as shown in FIGS. 18 and 19, slightly separated from the cover 61 by means of a plate spring 65a, fixed to the cassette holder 65, when the cover 61 takes the opening state so that an edge portion of the tape cassette 64 is inclined from the tip portion 61a of the cover 61 toward the tape recorder body 62 side so as to easily insert and take out the tape cassette 64 into and from the cassette holder 65.

However, such a conventional tape recorder has been disadvantageous however in that, even if the cover 61 is opened to take out the tape cassette 64, the distance between the edge portion of the tape cassette 64 and the curved tip portion 61a of the cover 61 is short so that the cover substantially cover one surface of the tape cassette 64 as before, and therefore the user is required to surely hold both the sides 64a of the small-sized tape cassette 64 and take it out. This complicates the removal of the tape cassette 64 by the user.

SUMMARY OF THE INVENTION

It is therefore an object of the present invention to provide a cassette tape cover apparatus for use in a tape recorder which is capable of easily taking out the tape cassette from the tape recorder.

According to the present invention there is provided a cover apparatus of a cassette tape recorder comprising: a first cover rotatable to be openable and closable with respect to a body of the tape recorder, the first cover having holding means to encase a tape cassette so that the tape cassette encased in the holding means is rotatable in accordance with the rotation of the first cover, a length of the first cover in longitudinal directions being smaller than that of the tape cassette so that a portion of the tape cassette protrudes from the first cover when being encased in the holding means; sliding means coupled to the first cover to be slidable along a side surface of the first cover; and a second cover engaged with the sliding means so that the first cover is coupled through the sliding means to the second cover, the first cover rotating to cover the entire tape cassette in cooperation with the second cover when the second cover is closed with respect to the tape recorder body. The second cover vertically moves by a predetermined height with respect to a surface of the first cover in accordance with a first sliding operation of the sliding means when the first cover is opened by a first predetermined angle with respect to the tape recorder body and horizontally n-Loving a predetermined distance with respect to the surface of the first cover in accordance with a second sliding operation of the sliding means when the first cover is opened by a second predetermined angle greater than the first predetermined angle so that the portion of the tape cassette protrudes from a tip portion of the second cover.

Preferably, the cover apparatus further includes link means, one end portion of which is supported by the tape recorder body to be rotatable about a supporting point different from a supporting point of the rotation of the first cover, the other end portion of the link means being rotatably coupled to the sliding means so that the sliding means slides in accordance with a movement of the link means made in accordance with an opening and closing operation of the first cover. The sliding means has an elongated hole inclined with respect to a sliding direction of the sliding means and the second cover has a guide pin fitted in the elongated hole of the sliding means, the second cover vertically moving with respect to the surface of the first cover with the guide pin being moved along the elongated hole of the sliding means in accordance with the movement of the link means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 3:
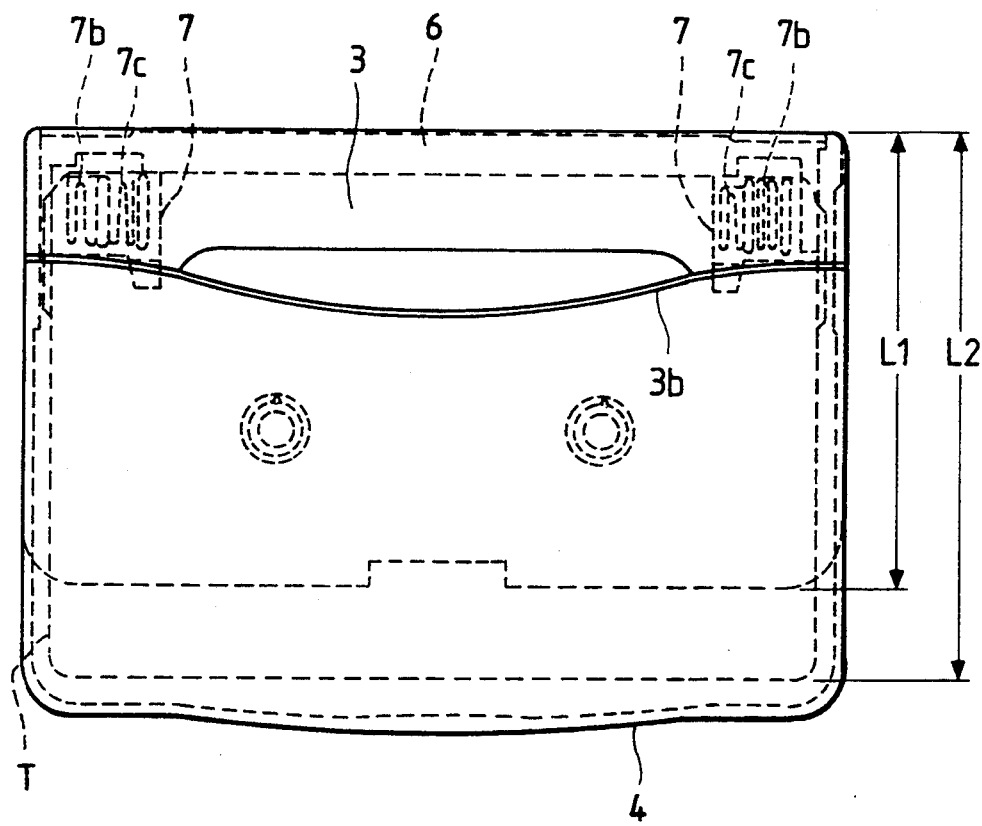
FIG. 3 is a plan view showing the tape recorder which takes a closed state.
Figure 4:
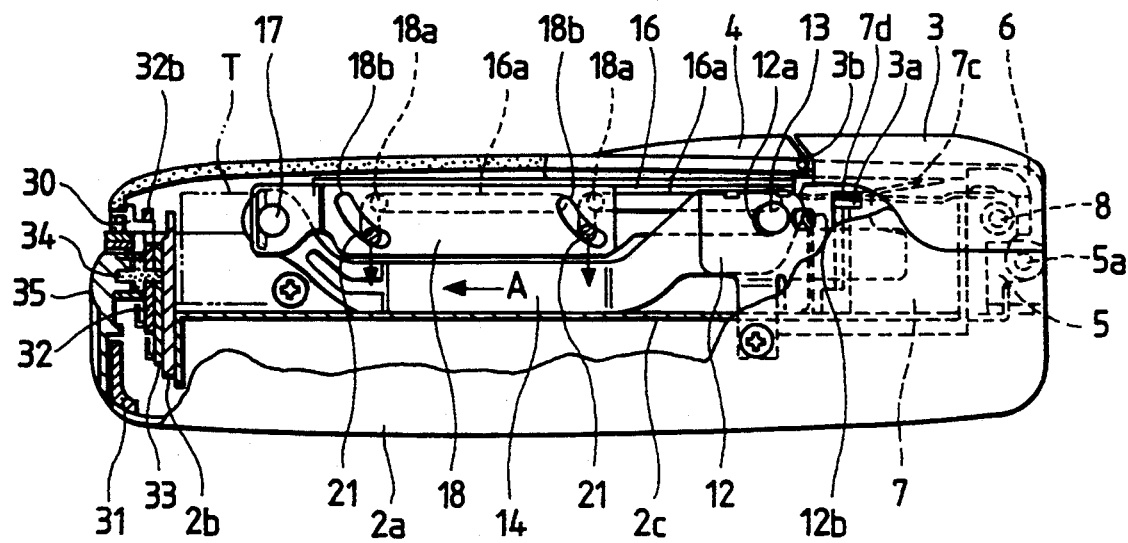
FIG. 4 is a partially cutaway side view showing the tape recorder which also takes the closed state.

Referring now to FIGS. 1 to 14, a description will be made hereinbelow in terms of a tape cassette cover apparatus for a tape recorder according to a first embodiment of this invention. In FIGS. 1 to 4, designated at numeral 1 is a cover comprising a primary cover portion 3 openable and closable with respect to a body 2 of the tape recorder and a secondary cover portion 4 slidable with respect to the primary cover portion 3. As illustrated in FIG. 3, the dimension L1 of the primary cover portion 3 in the longitudinal directions (the directions of the axis passing through the front and rear sides) is smaller than the dimension L2 of a tape cassette T in the longitudinal directions. The tape recorder T generally has a dimension that the length in the longitudinal directions is shorter than the length (width) in the lateral directions. Further, as illustrated in FIG. 2, the primary cover portion 3 has a curved stepped edge portion 3b to form a two-stepped structure, the stepped edge portion 3b extending throughout the entire width of the primary cover portion 3, and the rear portion from the stepped edge portion 3b of the primary cover portion 3 which is a higher portion acts as a surface of the cover 1 and the front portion therefrom, which is a lower portion, is covered by the secondary cover portion 4. As illustrated in FIGS. 3 and 4, the secondary cover portion 4 also has a curved edge portion at its rear end portion so that, when the cover 1 takes the closed state, the stepped edge portion 3b of the primary cover portion 3 is fitted to the edge portion of the secondary cover portion 4 throughout their widths. At this time, the rear portion of the primary cover portion 3 and the secondary cover portion 4 are in the same plane.

Figure 5:
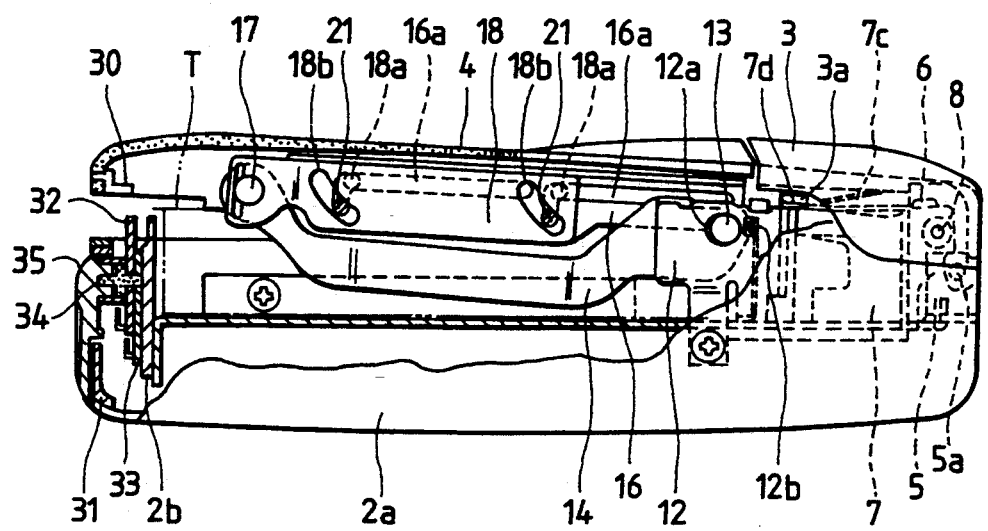
FIG. 5 is a partially cutaway side view showing the tape recorder which takes a pop-up state.
Figure 6:
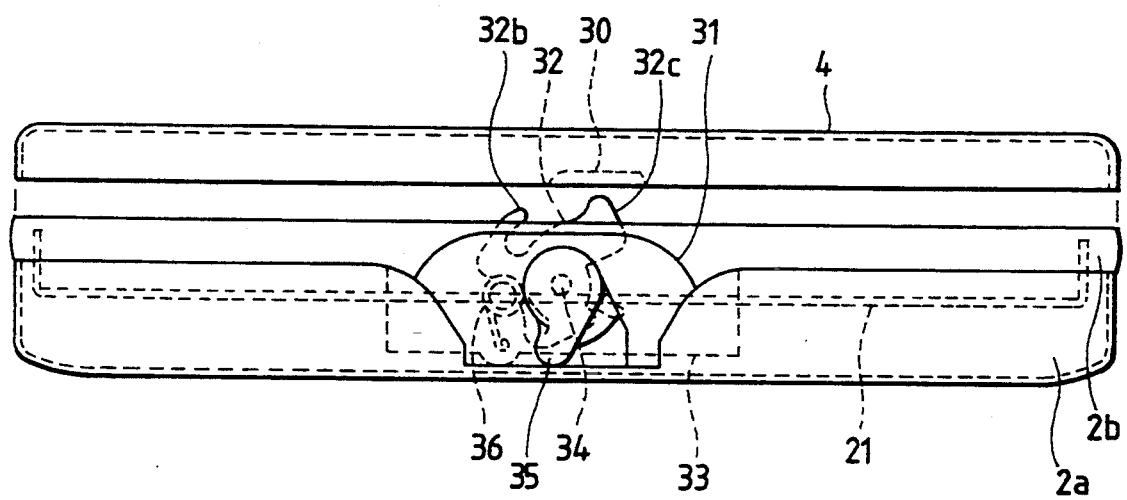
FIG. 6 is a front view showing the tape recorder which takes the pop-up state.

The tape recorder body 2 is equipped with a main cabinet 2a to form a lower surface of the tape recorder and side surfaces thereof, an intermediate cabinet 2b disposed on the main cabinet 2a, and a chassis 2c is disposed at the inside of the intermediate cabinet 2b to be placed below the tape cassette T set. As illustrated in FIG. 4, supporting brackets 5 are perpendicularly provided at both sides of the rear portion of the chassis 2c so that a head block 6 provided at a rear and upper portion of the tape recorder body 2 and extending in the width direction is supported by a supporting shaft 5a of the supporting brackets 5 to be rotatable about it. Moreover, to this head block 6 there are attached a pair of cassette holders 7 for holding both the sides of the tape cassette T to encase the tape cassette T and a head section including a head and pinch roller, not shown. In an upper plate 7a of the cassette holder 7 there are formed a plate spring 7b which comes into contact with the upper surface of the tape cassette T inserted into the cassette holder 7 to press the tape cassette T, a plate spring 7c which comes into contact with the lower surface (inner surface) of the primary cover portion 3 to press the primary cover portion 3, and a projection 7d which protrudes in a side direction to fit into a hole 3a of the primary cover portion 3 for the positional restriction. Here, due to the biasing force of the plate spring 7c the primary cover portion 3 is arranged to be rotatable about a shaft 8, provided in the head block 6, by a predetermined angle (corresponding to a moving distance of the projection 7d of the cassette holder 7 from the upper surface of the hole 3a of the primary cover portion 3 up to the lower surface of the hole 3a thereof, while this rotation of the primary cover portion 3 is effected in a range from the closed state of the cover 1 as illustrated in FIG. 4 to the pop-up state of the cover 1 as illustrated in FIG. 5 or 6. For further opening the primary cover portion 3 from the pop-up state as shown in FIG. 5 or 6 with respect to the tape recorder body 2, the primary cover portion 3 is rotated about the supporting shafts 5a of the supporting brackets 5. In this further opened state, the tape cassette T can be taken out from the cassette holders 7 without coming in contact with mechanism parts such as a capstan.

Figure 1:
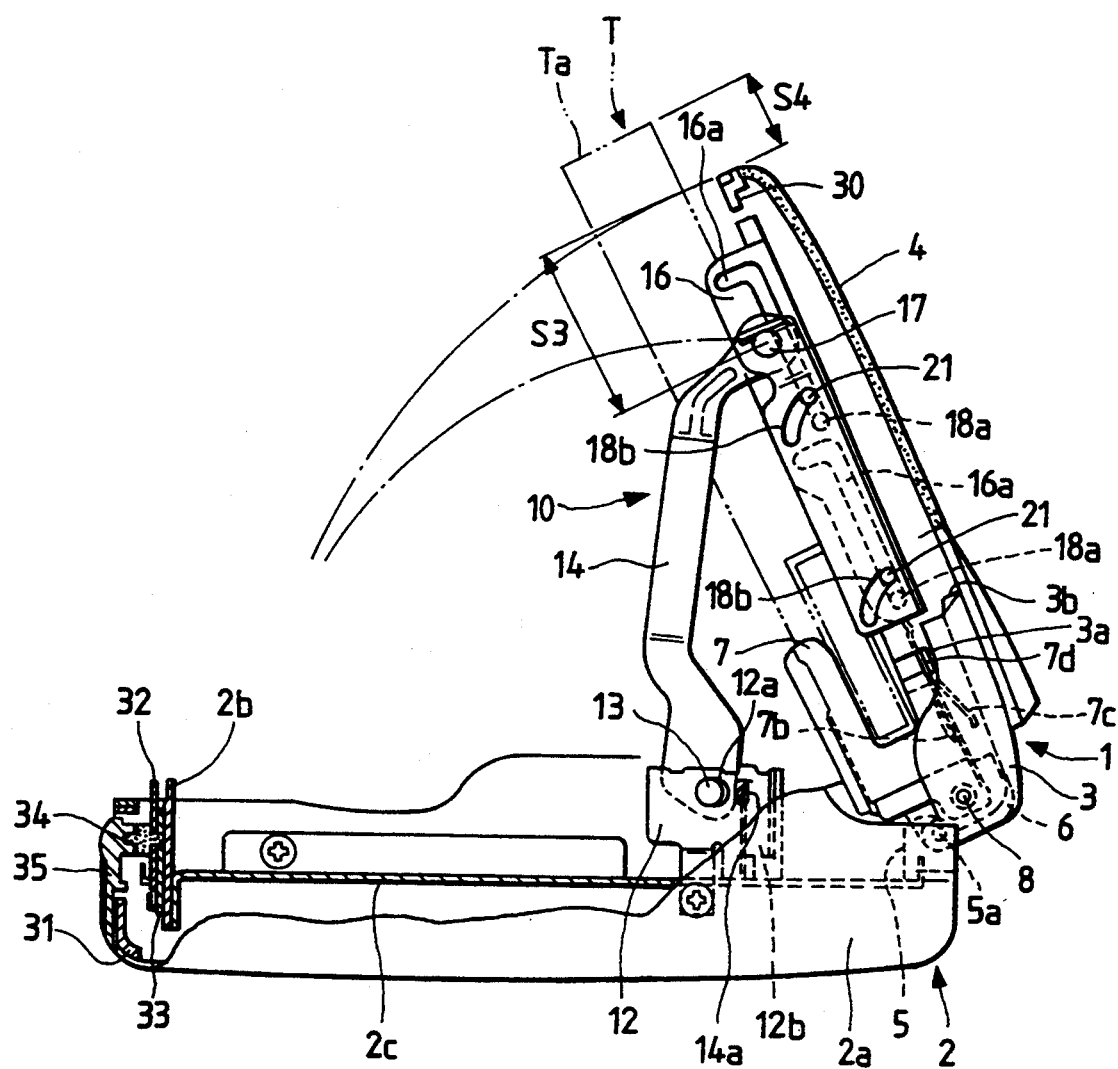
FIG. 1 is a partially cutaway side view showing a tape recorder including a tape cassette cover apparatus according to a first embodiment of the present invention which takes an opening state.
Figure 2:
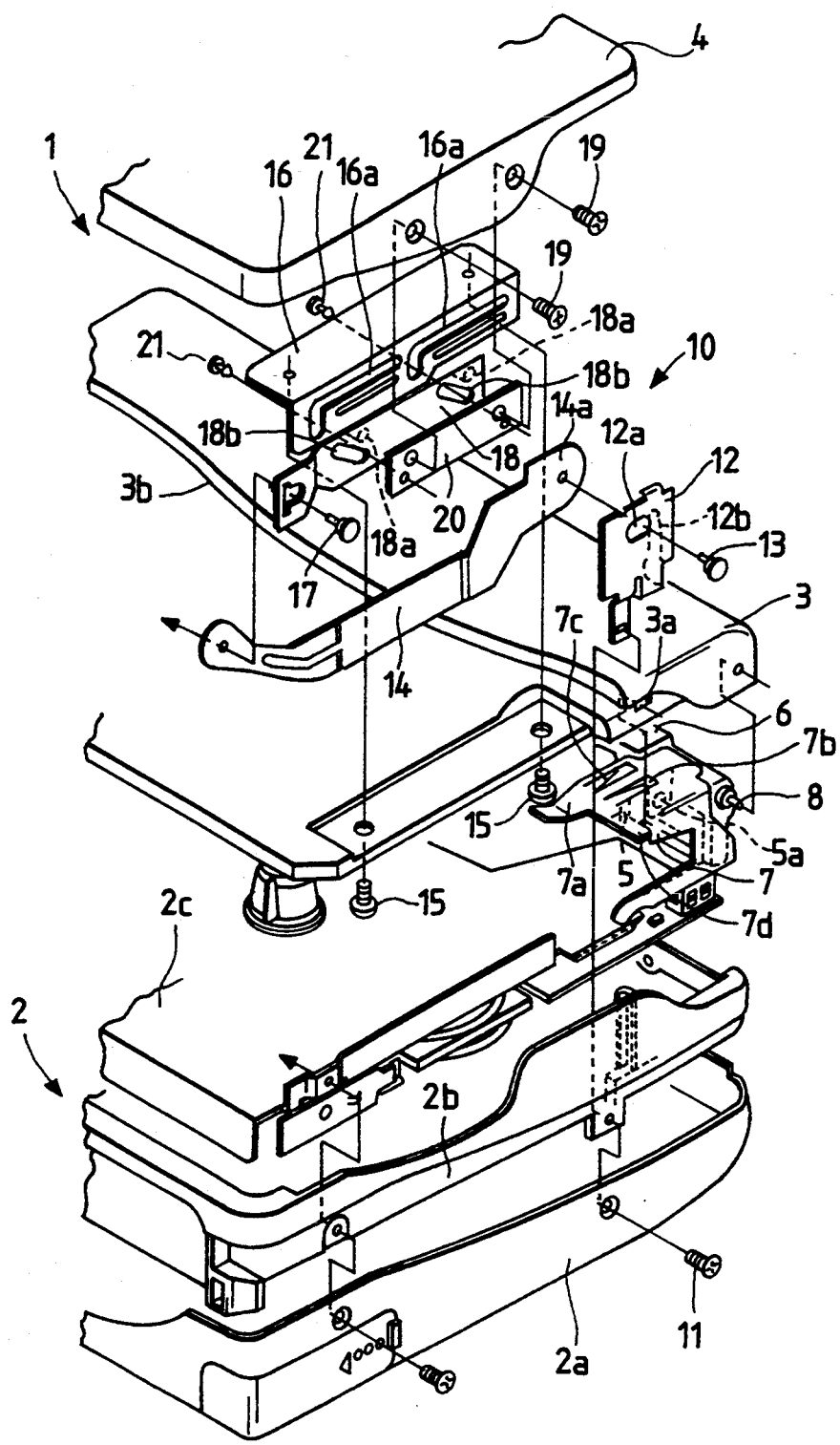
FIG. 2 is an exploded perspective view showing the tape recorder.

Still further, as illustrated in FIGS. 1 and 2, a pair of arm mechanisms 10 are at both sides provided between the tape recorder body 2 and the cover 1. Each of the arm mechanisms 10 comprises a bearing plate 12 attached through a screw 11 to the tape recorder body 2 to be vertically placed in front of the cassette holder 7 and having a slightly elongated hole 12a, a link 14 one end portion of which is loosely and rotatably supported by a shaft 12 fitted in the hole 12a of the bearing plate 12. Also, a curved guide plate 16 fixedly attached through a screw 15 to a front side portion of the upper surface of the primary cover portion 3 so that its curved portion having L-shaped guide holes 16a becomes a side surface of the primary cover portion 3, a slider 18 rotatably coupled through a shaft 17 to the other end portion of the link 14 and having projections 18a horizontally protruding to the inside to movably engage with the guide holes 16a of the guide plate 16 and further having holes 18b elongated obliquely and downwardly, and a supporting plate 20 fixedly attached through screws 19 to a side and inner surface of the secondary cover portion 4. Further, two guide pins 21 are respectively fixed to the supporting plate 20 after passing through the guide holes 16a of the guide plate 16 and the obliquely (inclined) elongated holes 18b. Here, to the bearing plate 12 which supports the one end portion of the link 14, there is attached a biasing spring plate 12b which comes into contact with a read end portion of the link 14 to bias and press the link 14 toward the front side. In addition, the rear end portion of the link 14 is arranged to have a stepped portion 14a.

Figure 7:
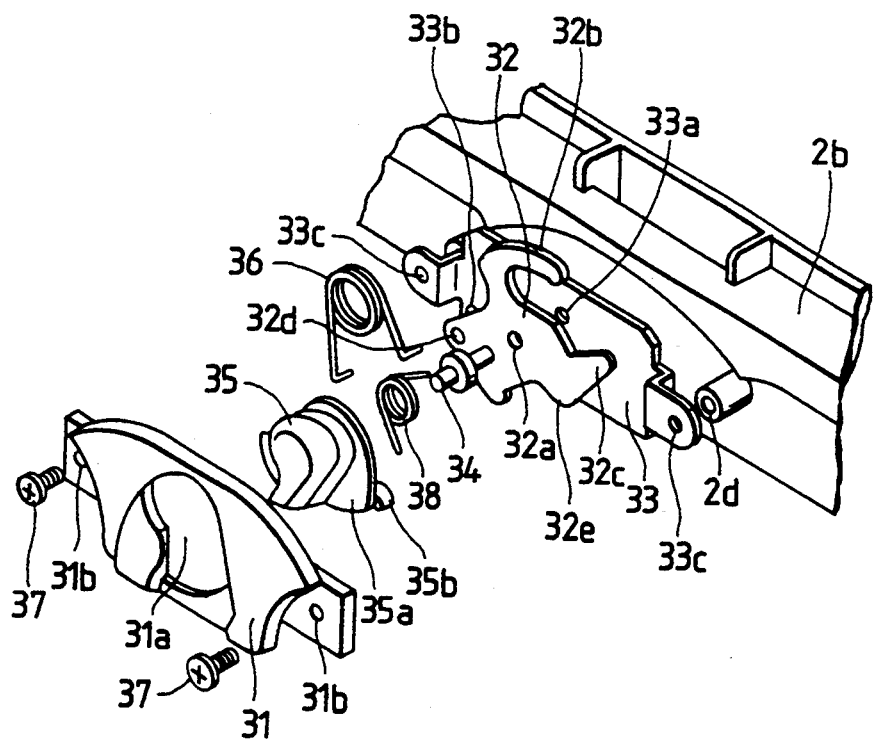
FIG. 7 is an exploded perspective view showing a lock mechanism of the cover apparatus of the tape recorder.

As shown in FIG. 7, the intermediate cabinet 26 is equipped with a control ornament 31 and a lock cam supporting base 33 for rotatably supporting a lock cam 32. The lock cam 32 is rotatably supported by a rotating shaft 34 fitted in a hole 33a of the lock cam supporting base 33. Further, an operating lever 35 is rotatably supported by the rotating shaft 34. This operating lever 35 is fitted in a center hole 31a of the control ornament 31 so that the lock cam 32 is rotationally operated by the operating lever 35 at the time of closing the cover 1. The lock cam 32 takes a position to be in opposed relation to an engaging member 30 provided at a front and center portion of the secondary cover portion 4. Further, the lock cam 32 is equipped with an engaging claw 32b engageable with the engaging member 30 of the secondary cover portion 4 and a pressing portion 32c protruding toward the engaging member 30 side when the cover 1 takes the opening state as illustrated in FIG. 6. Moreover, the lock cam 32 has a spring-operated portion 32d provided in the opposite position to the pressing portion 32c with respect to the rotating shaft 34 and a toggle spring 36 provided between the spring-operated portion 32d and a spring-supporting portion 33b of the lock cam supporting base 33. The lock cam supporting base 33 has fitting holes 33c to bosses 2c formed on the intermediate cabinet 2b and the control ornament 31 also has fitting holes 31b to the same bosses 2c so that the control ornament 31, together with the lock cam supporting base 33, is attached to the intermediate cabinet 2c with screws 37 being engaged through the fitting holes 31b and 33c with the bosses 2c. Further, the operating lever 35 is provided with a flat plate portion 35a for covering the center hole 31a of the control ornament 31 and a projection 35b acting as an application point for rotationally operating the lock cam 32 at the time of opening the cover 1. The operating lever 35 is always rotationally urged clockwise by a spring (coil spring) 38. The projection 35b of the operating lever 35 comes into contact with a lower circumferential surface 32e of the pressing portion 32c of the lock cam 32 to press the lock cam 32 at the time of an opening operation of the cover 1 which will be described hereinafter.

Secondly, a description will be made in terms of an operation of the above-described cover apparatus. The description will first be made in terms of the operation of the primary cover portion 3 and the secondary cover portion 4 from the cover-closed state to the cover-opening state. When the cover 1 takes the closed state, as illustrated in FIG. 4, the tape cassette T is completely covered by the primary cover portion 3 and the secondary cover portion 4. That is, the arm mechanism 10 including the guide plate 16, slider 18, supporting plate 20 and link 14 takes a substantially horizontal position, and the cassette holders 7 is pressed downwardly by means of the plate spring 7c which is brought into contact with the lower surface of the primary cover portion 3. Further, since the link 14 is biased to the front side (in a direction indicated by an arrow A in FIG. 4) by means of the biasing plate spring 12b provided on the bearing plate 12, the slider 18 coupled to the link 14 is also biased to the front side and, in accordance with this biasing, the guide pins 21 fitted in the obliquely elongated holes 18a of the slider 18 are pressed downwardly along the obliquely elongated hole 18a surface. As a result, in connection with the guide pins 21, the supporting plate 20 and the secondary cover portion 4 are pressed downwardly so that the secondary cover portion 4 closely contacts with the tape recorder body 2. At this time, the surfaces of the primary cover portion 3 and the secondary cover portion 4 are in the same plane. Here, the guide pins 21 are positioned at the vicinity of the lower end portions of the guide holes 16a of the guide plate 16 and at the vicinity of the obliquely elongated holes 18b of the slider 18.

Figure 8:
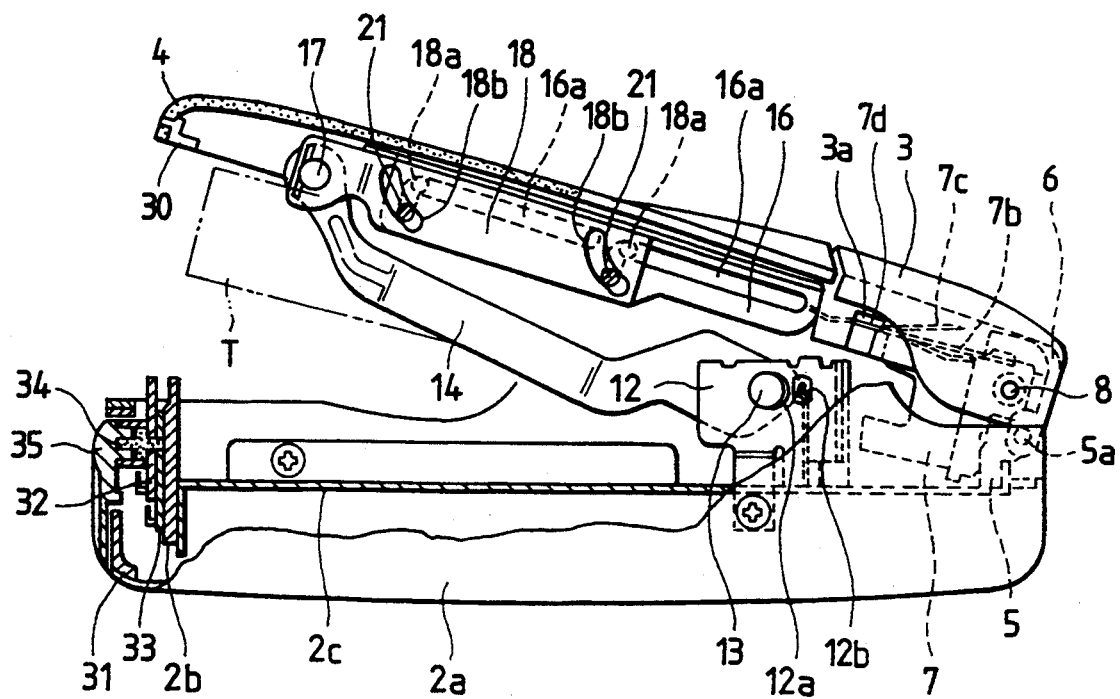
FIG. 8 is a partially cutaway side view showing the tape recorder which takes an opening state.
Figure 9:
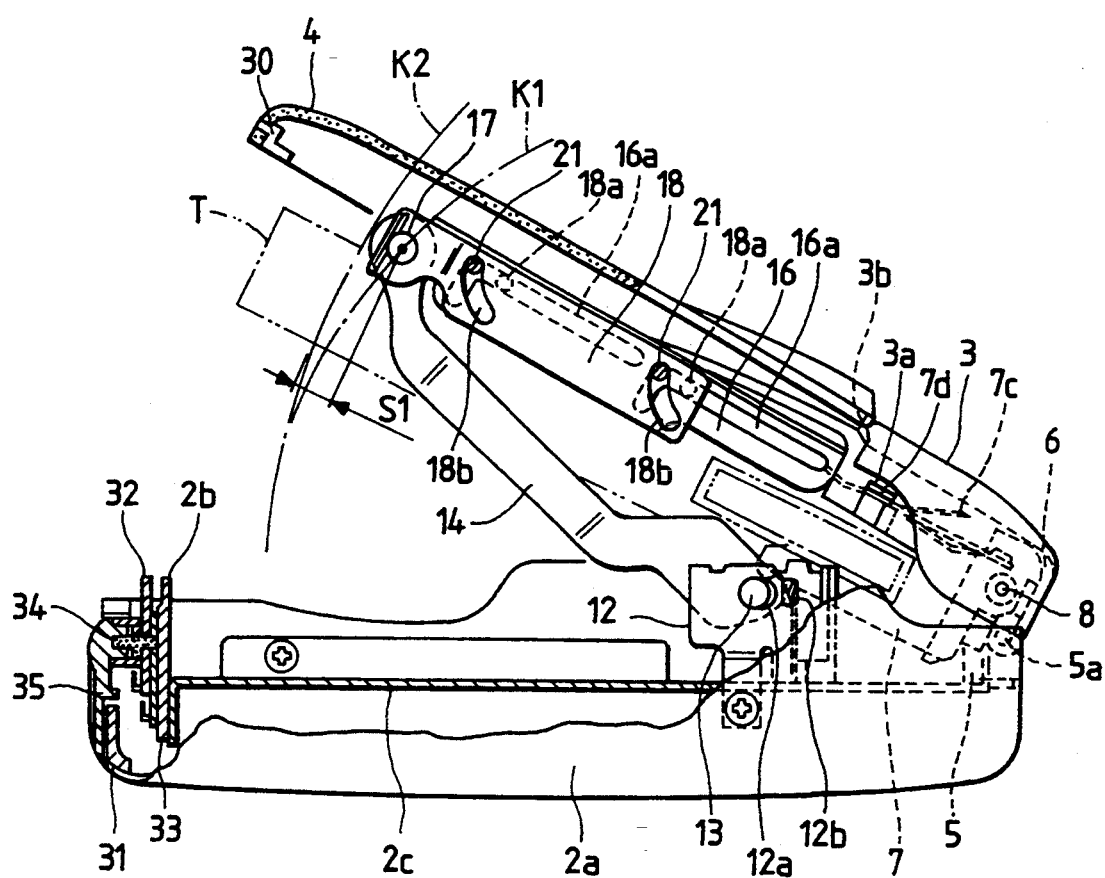
FIG. 9 is a partially cutaway side view showing the tape recorder which takes an opening state.
Figure 10:
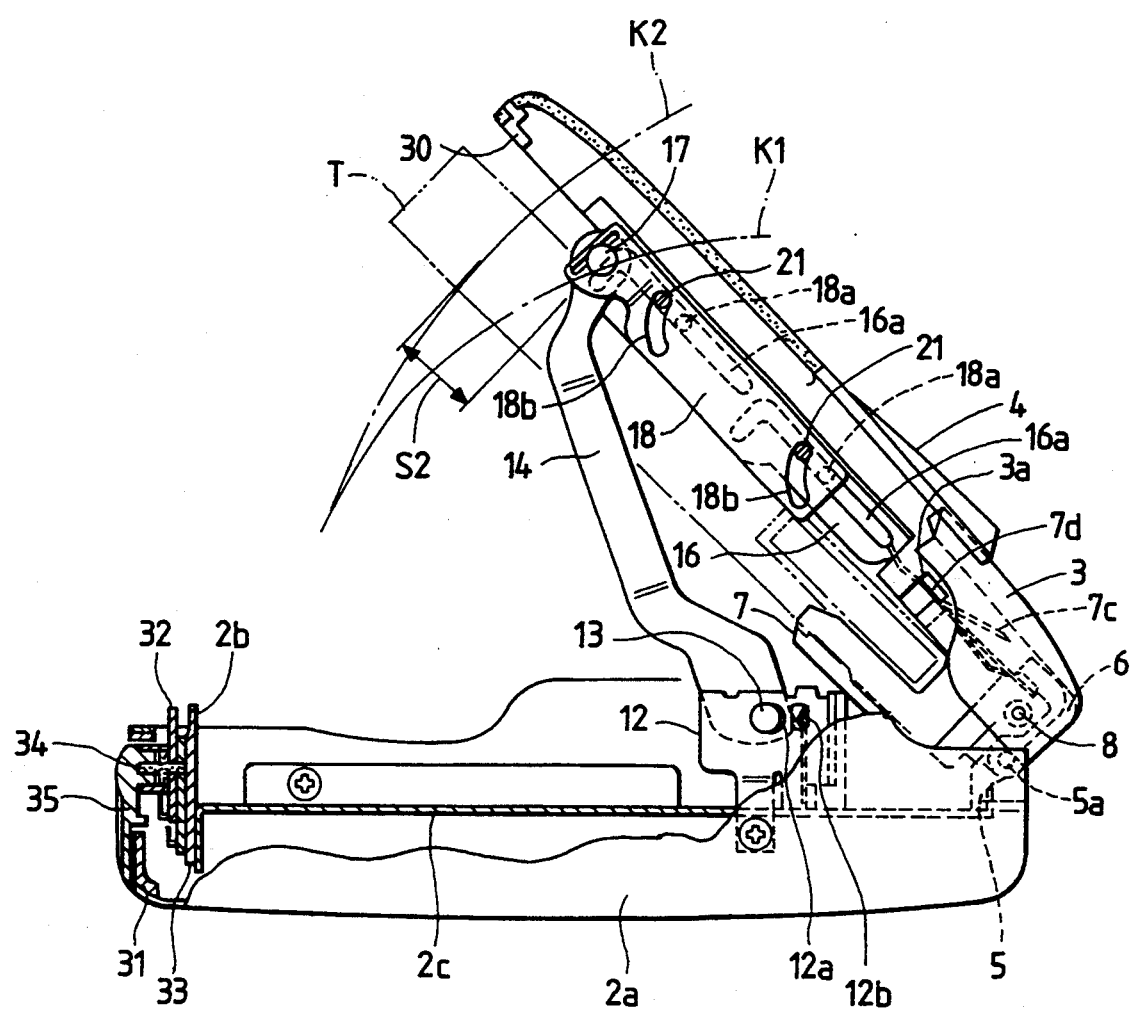
FIG. 10 is a partially cutaway side view showing the tape recorder which takes an opening state.

When the operating lever 35 is operated so as to release the engaging member 30 of the secondary cover portion 4 from the engaged state due to the lock cam 32, as illustrated in FIG. 5, the primary cover portion 3 is rotated about the shaft 8 by the plate spring 7c of the cassette holder 7 so that the projection 7d of the cassette holder 7 comes into contact with the lower surface of the hole 3a of the primary cover portion 3, thereby taking the pop-up state. Thereafter, as illustrated in FIG. 8, when the cover 1 is further rotated, the primary cover portion 3, together with the head block 6, starts to rotate about the supporting shaft 5a of the supporting bracket 5. On the other hand, due to the biasing force of the biasing spring plate 12b the shaft 13 attached to the link 14 is pressed against the front side wall of the hole 12a of the bearing plate 12 so that the link 14 is rotated about the shaft 13 taking this position. Moreover, as illustrated in FIG. 9, in response to a further opening operation of the cover 1, the slider 18 slides with respect to the guide plate 16 by a difference S1 between the rotational locus K1 of the link 14 and the rotational locus K2 of the primary cover portion 3. At the same time, the guide pins 21 slide in the obliquely elongated holes 18b of the slider 18 to move upwardly along the vertical portions of the guide holes 16a of the guide plate 16, whereby the secondary cover portion 3 is lifted up to a position slightly higher than the height of the stepped portion 3b of the primary cover portion 3. Still further, as illustrated in FIG. 10, when the cover 1 additionally takes an opening state, the slider 18 slides with respect to the guide plate 16 by a difference S2 between the rotational locus K1 of the link 14 and the rotational locus K2 of the primary cover portion 3. That is, the guide pins 21 slide along the horizontal portions of the guide holes 16a of the guide plate 16 so that the secondary cover portion 4 is overlapped with the primary cover portion 3. Moreover, as illustrated in FIG. 1, when the cover 1 opens, the slider 18 slides with respect to the guide plate 16 by a difference S3 between the rotational locus K1 of the link 14 and the rotational locus K2 of the primary cover portion 3. The projections 18a of the slider 18 come into contact with the end surfaces of the horizontal portions of the guide holes 16a of the guide plate 166 to be limited in position, and the tip portion of the biasing spring plate 12b is engaged with the stepped portion 14a of the link 14 to keep this opened state. In this case, the secondary cover portion 4 is overlapped with the primary cover portion 3 and a front portion Ta of the tape cassette T protrudes obliquely and upwardly by an amount S4 from the tip portion of the secondary cover portion 4. Accordingly, it is possible to easily take out the tape cassette T from the cassette holders 7 by holding the protruded portion Ta by fingers.

Here, in the case of inserting the tape cassette T into the cassette holders 7, since most of the secondary cover portion 4 is overlapped with the primary cover portion 3 in the cover-opened state so as to reduce the size of the cover 1, it is also possible to easily insert the tape cassette T into the cassette holders 7 by holding the front portion Ta of the tape cassette T. After the insertion of the tape cassette T into the cassette holders 7, with the secondary cover portion 4 being held and closed, contrary to the above-described opening operation the secondary cover portion 4 protrudes from the primary cover portion 3, and when taking the closed state as illustrated in FIG. 3, the tape cassette T is completely covered by the primary and secondary cover portions 3 and 4.

Figure 11:
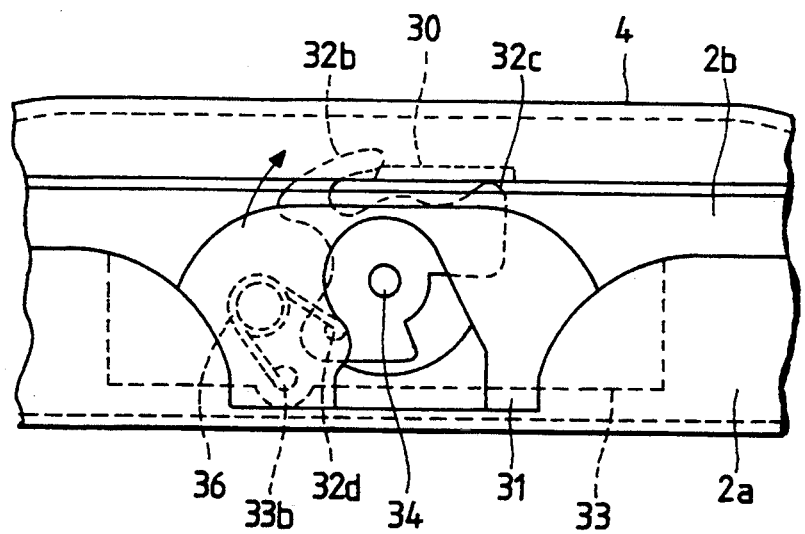
FIGS. 11 to 14 are partial front views for describing an operation of the lock mechanism of the cover apparatus of the tape recorder.
Figure 12:
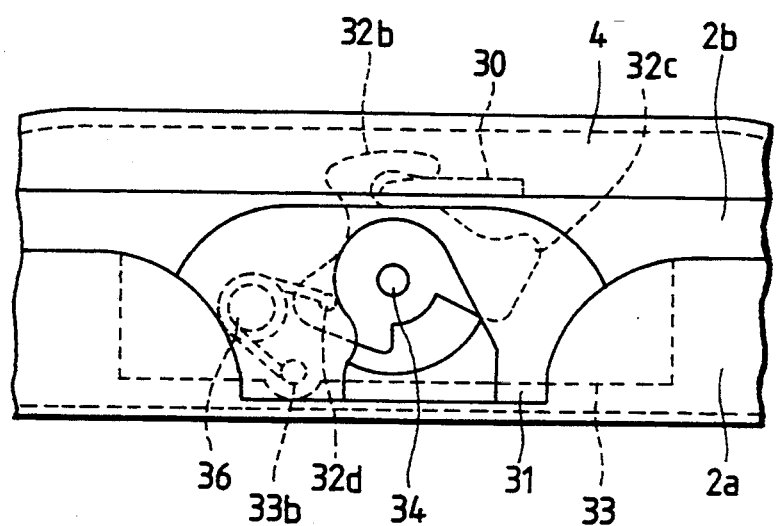

Secondary, a description will be made hereinbelow in terms of the operation of the lock mechanism. First, if in the cover-opening state as illustrated in FIG. 6, i.e., in a first biasing state that the lock cam 32 is biased counterclockwise by the toggle spring 36, the cover 1 is closed against the biasing force of the toggle spring 36, a state as illustrated in FIG. 11 is taken. In the FIG. 11 state, the engaging claw 32b is engaged with the end portion of the engaging member 30, the spring-operated portion 32d of the lock cam 32 is positioned on the connection line between the axis of the rotating shaft 34 and the spring-supporting portion 33b, and the toggle spring 36 takes the middle position. Accordingly, even if the cover 1 is slightly pressed in the cover-closing direction from the FIG. 11 state, due to the biasing force of the toggle spring 36 the lock cam 32 is rotated in a direction indicated by an arrow in FIG. 11 whereby the cover 1 enters into the closed state as illustrated in FIG. 12. In the FIG. 12 state, the toggle spring 36 becomes in a stable state which is a second biased state to clockwise bias the lock cam 32, and the engaging claw 32b of the lock cam 32 always presses the engaging member 30 of the cover 1 in the cover-closing direction.

Figure 13:
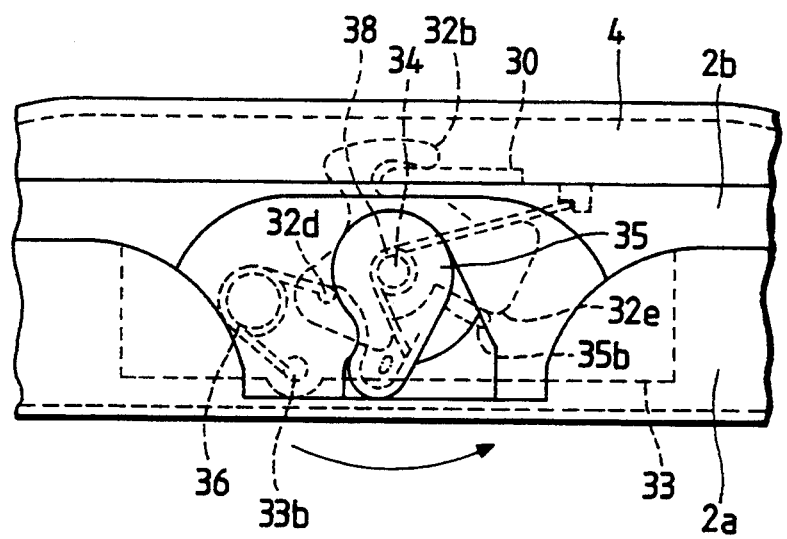
Figure 14:
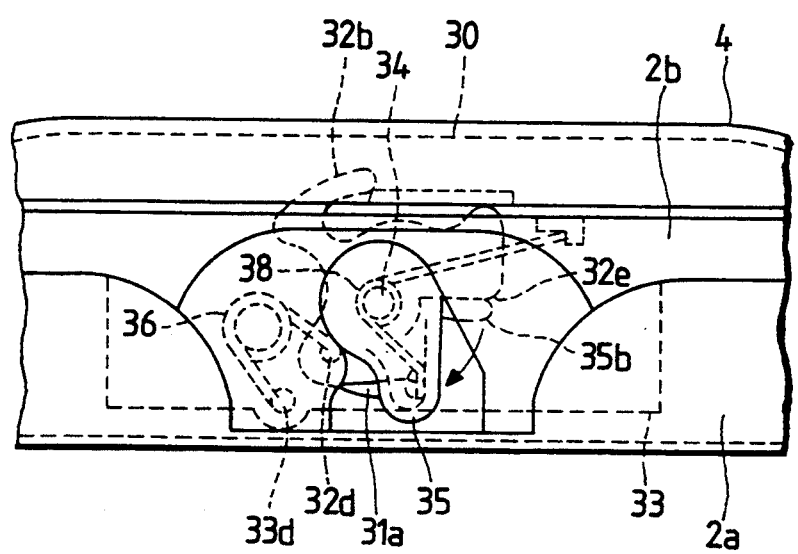

Further, a description will be made hereinbelow in terms of the operation of the lock mechanism from the cover-closing state to the cover-opening state. FIG. 13 shows the second biasing state due to the toggle spring 36 as well as the state as illustrated in FIG. 12. In this state, the operating lever 35 is rotationally biased clockwise about the rotating shaft 34 by the spring 38 so that a portion of the circumferential surface of the operating lever 35 is brought into contact with the inner wall of the center hole 31a of the control ornament 31 and the projection 35b comes into contact with or approaches the circumferential surface 32e of the lock cam 32. When opening the cover 1 from the FIG. 13 state, the operating lever 35 is operated to be rotated counterclockwise about the rotating shaft 34 in a direction as indicated by an arrow in FIG. 13 so that the projection 35b upwardly presses the circumferential surface 32e of the lock cam 32 to counterclockwise rotate the lock cam 32 against the clockwise biasing force of the toggle spring 36. When the lock cam 32 is rotated as shown in FIG. 14, the spring-operated portion 32d of the lock cam 32 is at the neutral position of the toggle spring 36 which is on the connection line between the axis of the rotating shaft 34 and the spring-supporting portion 33b. Even if the operating lever 35 is slightly rotated counterclockwise from the FIG. 14 state, the lock cam 32 is compulsively rotated counterclockwise by means of the biasing force of the toggle spring 36 so that the engaging claw 32b is disengaged with the engaging member 30 and the pressing portion 32c upwardly presses the engaging member 30, thereby taking the first biasing state due to the toggle spring 36 as illustrated in FIG. 6.

Here, the operating lever 35 is always rotationally biased clockwise by the spring 38, and when being released from fingers after the completion of the opening operation up to the FIG. 14 state, the operating lever 35 is pulled back up to the position at the cover-closed time by means of the resilience of the spring 38 compressed. Further, with the second biasing state of the toggle spring 36 taken when the cover 1 is in the closing state being always kept even after the cover 1 is closed, the cover 1 can stably take the closed relation to the tape recorder body 2. That is, even if the cover 1 comprises the primary cover portion 3 and the secondary cover portion 4, the above-described lock mechanism can surely provide the closed state between the cover 1 and the tape recorder body 2.

Figure 15:
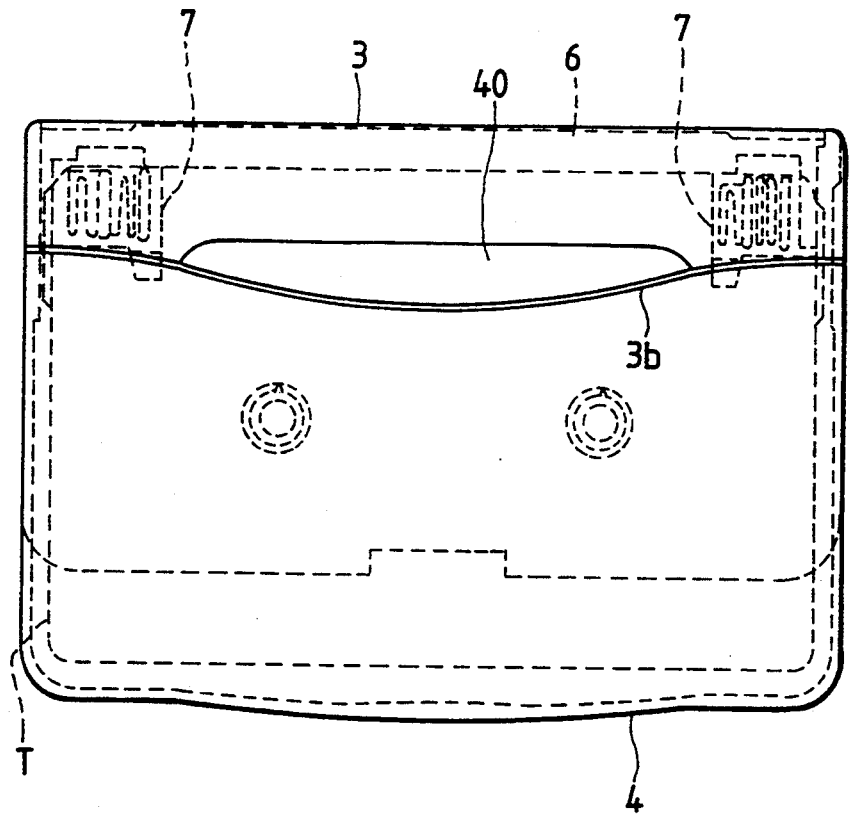
FIG. 15 is a plan view showing a tape recorder including a cover apparatus according to a second embodiment of this invention.
Figure 16:
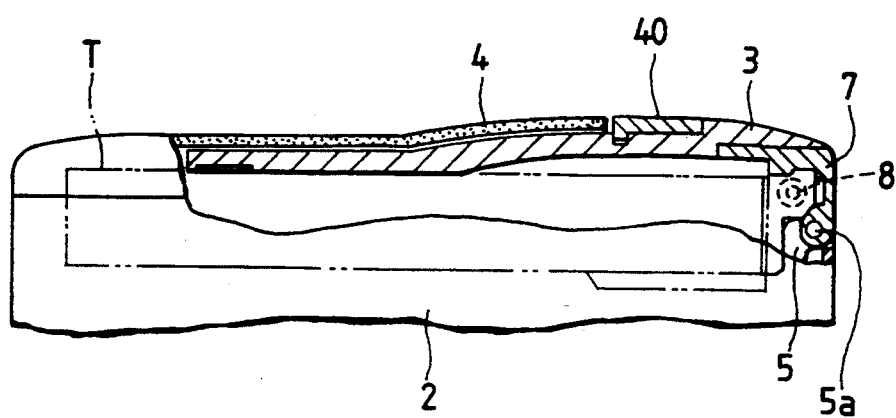
FIG. 16 is a partially cutaway side view showing the tape recorder according to the second embodiment.
Figure 17:
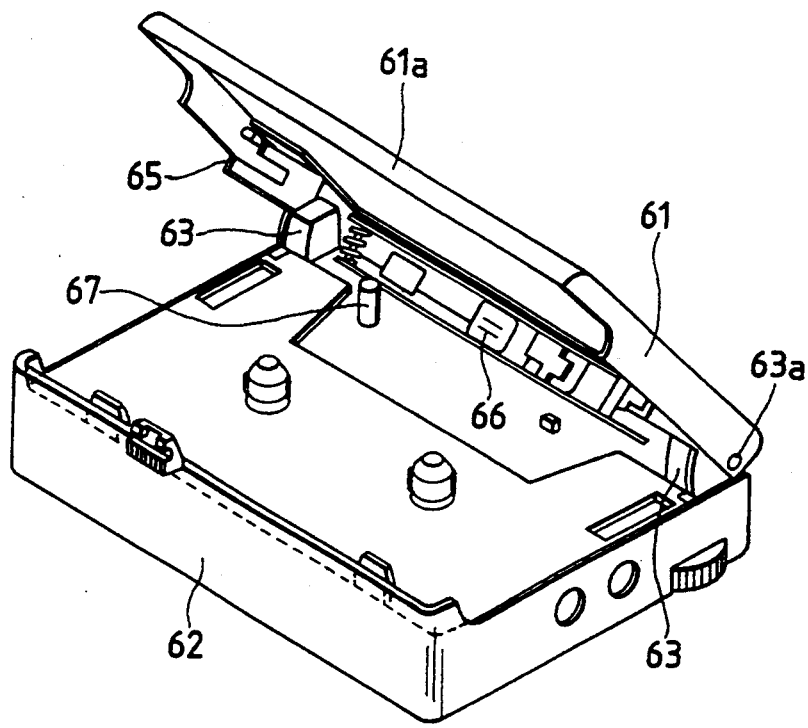
FIGS. 17 to 19 are illustrations for describing a conventional cover apparatus for use in a tape recorder.
Figure 18:
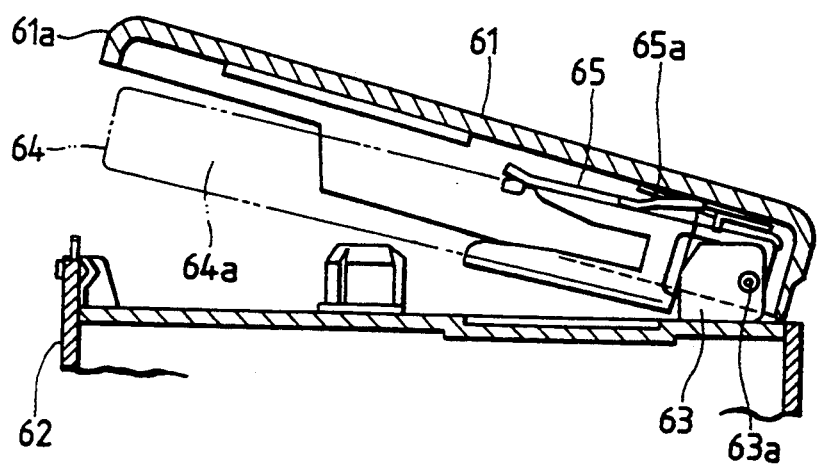
Figure 19:
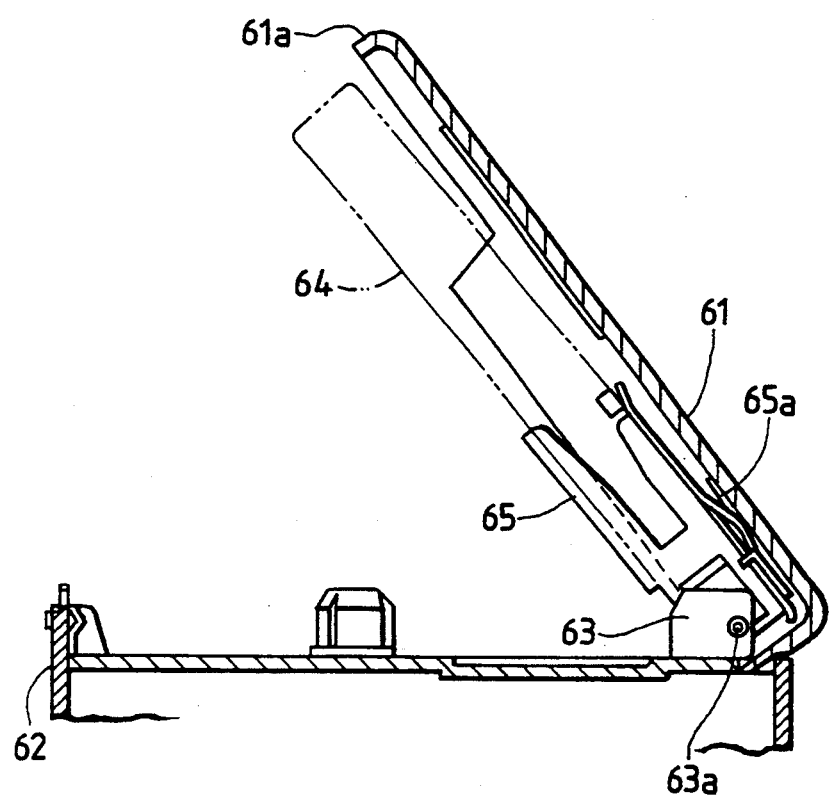

Here, it is also appropriate that as illustrated in FIGS. 15 and 16 an ornamental plate 40 is provided along the stepped edge portion 3b of the primary cover portion 3 so as to improve the appearance of the cover 1. Further, although in the above-described embodiment the cassette holders 7 and head block 6 are arranged to be rotated together with the cover 1, it is appropriate that the head block is provided at the tape recorder body side. Moreover, it is also appropriate that the cover is constructed with flat plates to constitute a portion of the upper surface of the tape recorder.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A cover apparatus for a cassette tape recorder comprising:
   a tape recorder casing;
   tape cassette holding means for holding a tape cassette in said tape recorder casing;
   a cover assembly covering said tape recorder casing, said cover assembly including a first cover and a second cover, the first cover retaining said tape cassette holding means and being rotatably supported by said tape recorder casing, the second cover being arranged flush with the first cover; and
   cover sliding means, responsive to rotational motion of the first cover relative to said tape recorder casing, for sliding the second cover relative to the first cover so as to partially expose the tape cassette, held in said tape cassette holding means, outside said cover assembly, said cover sliding means establishing first and second movements of the second cover along first and second paths of travel according to the rotational motion of the first cover, the first movement being such that when the first cover is opened to a first preselected angle, the second cover is displaced along the first path of travel in a direction vertical to a surface of the first cover by a given distance, the second movement being such that when the first cover is opened to a second preselected angle greater than the first preselected angle, the second cover is displaced along the second path of travel in a direction parallel to the surface of the first cover.

2. A cover apparatus as set forth in claim 1, wherein said cover sliding means includes a link, a guide member, and a slider, the link pivotably connecting with said tape recorder casing, the guide member being attached to the first cover and defining the first and second paths of travel, the slider connecting between the second cover and the link through the guide member so as to move the second cover along the first and second paths of travel according to the rotational motion of the first cover.

3. A cover apparatus as set forth in claim 2, wherein the guide member includes first and second grooves, the first groove defining the first path of travel, while the second groove defines the second path of travel, the second cover having a pin slidably engaging the guide member through the first and second grooves, the slider having the pin of the second cover slide along the first and second grooves of the guide member according to pivotal movement of the link caused by the rotational motion of the first cover.

4. A cover apparatus as set forth in claim 3, wherein the first cover of said cover assembly is rotatably supported by said tape recorder casing through a first support shaft so that said cover assembly is opened along a first rotational locus, the link being pivotably supported by said tape recorder casing through a second support shaft so as to rotate along a second rotational locus according to the rotational motion of the first cover, the slider being responsive to the pivotal movement of the link caused by the rotational motion of the first cover to cause the pin of the second cover to slide along the first and second grooves of the guide member according to a difference between the first and second rotational loci.

* * * * *